Patented Feb. 20, 1934

1,948,208

UNITED STATES PATENT OFFICE 1,948,208

AZO-DYESTUFFS

Friedrich Felix and Wilhelm Huber, Basel, Switzerland, assignors to Society of Chemical Industry in Basle, Basel, Switzerland No Drawing. Application June 8, 1933, Serial No. 674,965, and in Switzerland July 8, 1932

3 Claims. (Cl. 260—97)

According to this invention valuable dyestuffs are obtained by reaction between an unsulfonated diazotized 5-nitro-ortho-aminophenol and an aromatic base substituted at the nitrogen atom by an hydroxyalkyl-group.

These dyestuffs are obtained by combining diazotized 5-nitro-ortho-aminophenols, such as 5-nitro-ortho-aminophenol of the formula

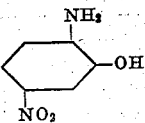

or 6-chloro-5-nitro-ortho-aminophenol of the formula

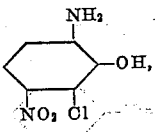

in a solution which is strongly acid towards Congo with an aromatic base containing an hydroxyalkyl-group linked to the nitrogen atom.

There are suitable as coupling components bases which are capable of coupling and contain at the nitrogen atom an hydroxyalkyl residue and also a free hydrogen atom, for example (ω-hydroxyethyl)-aniline of the formula

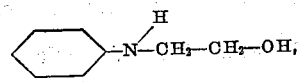

(ω-hydroxyethyl)-meta-toluidine of the formula

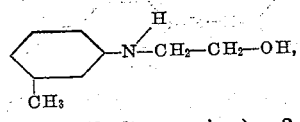

(1 - (ω - hydroxyethyl) - amino) - 2 - methoxy-5-methylbenzene of the formula

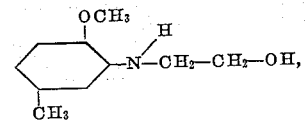

(1-(ω-hydroxyethyl)-amino)-2:5-dimethoxybenzene of the formula

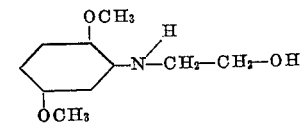

also alkyl-hydroxyalkylated and di-hydroxyalkylated bases, as, for example, ethyl-(ω-hydroxyethyl)-aniline of the formula

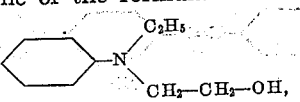

dihydroxyethylaniline of the formula

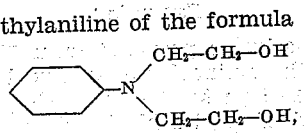

and so on.

The dyestuffs obtainable by the invention are excellently suited for dyeing cellulose esters and ethers, especially acetate silk which they dye fast, remarkably pure shades. The shades obtainable with the dyestuffs vary from red to violet.

All these dyestuffs are new. They correspond to the general formula

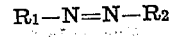

wherein $R_1$ means an aryl radical of the benzene series which contains an OH-group in ortho-positon to the —N=N-group and an $NO_2$-group in para-position to the same —N=N-group, and wherein further $R_2$ means an aryl-radical of the benzene series which contains an

group in para-positon to the —N=N-group, $R_3$ meaning an alkyl-group which contains, on the one part, at least two carbon atoms, and, on the other, an OH-group, and $R_4$ meaning hydrogen, alkyl or a substituted alkyl. They form dark powders which dissolve in ethyl acetate to red to violet solutions, and dye acetate silk or quite generally cellulose esters and cellulose ethers from aqueous suspensions fast red to violet tints of great purity. Among these dyestuffs those are particularly valuable in which the radical $R_3$ corresponds to a $CH_2$—$CH_2$—OH group, and the radical $R_4$ to a hydrogen atom or an alkyl group.

For dyeing acetate silk the dyestuffs, which are themselves sparingly soluble, are advantageously used in a finely divided form. For this purpose they may be ground with a dispersing agent, for example the sulfonated residues from the manufacture of benzaldehyde or turpentine oil, in presence of water to produce a fine paste; or they may advantageously be converted, by cautiously drying them in presence of a further quantity of the aforesaid or other assistants, such as sulfite cellulose waste liquor, into dry powdered preparations.

The following examples illustrate the invention, the parts being by weight:—

Example 1

15.4 parts of 5-nitro-ortho-aminophenol are ground together with 300 parts of water and the suspension so obtained is diazotized by means of 25 parts of concentrated hydrochloric acid and 7 parts of sodium nitrite. The diazo-solution so obtained is combined with a solution of 18.1 parts of (1-(ω-hydroxyethyl)-amino)-2-methoxy-5-methyl-benzene in dilute hydrochloric acid. The dyestuff which separates after stirring for some time is filtered and washed. It is a violet powder which dyes acetate silk bright red-violet shades. The new dyestuff corresponds very probably with the formula

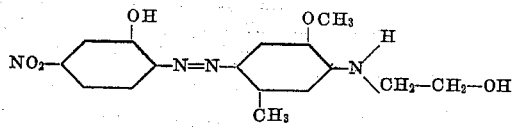

Example 2

A diazo-solution prepared from 15.4 parts of 5-nitro-ortho-aminophenol is mixed with a solution of 16.5 parts of ethyl-(ω-hydroxyethyl)-aniline in dilute hydrochloric acid, and the whole is stirred for some time. When coupling is completed the dyestuff is filtered and washed. It is a red brown powder which dyes acetate silk bluish red shades. The new dyestuff corresponds very probably with the formula

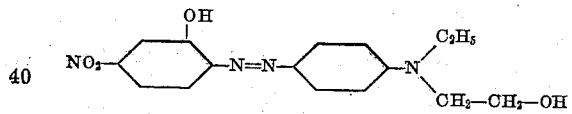

Example 3

A diazo-solution prepared from 15.4 parts of 5-nitro-ortho-aminophenol as described in Example 1 is mixed with a solution of 13.7 parts of ω-hydroxyethyl-aniline in dilute hydrochloric acid. After the dyestuff has been formed it is filtered and washed. The dyestuff so obtained is a red powder which dyes acetate silk yellow red shades. The new dyestuff corresponds very probably with the formula

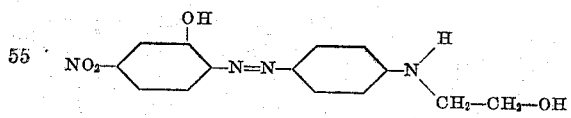

Example 4

10 parts of the dyestuff described in Example 1 are stirred with the addition of a suitable dispersing agent, such as Turkey red oil, sulfite cellulose waste liquor, or a sulfonation product of the residue of the manufacture of benzaldehyde so as to form a uniform paste containing 20 per cent. of dyestuff. One part of this paste is very intimately mixed with 10 parts of water of 50° C. and such a quantity of concentrated soap solution that the dye-bath to be made from the mixture will correspond with a soap solution of 2 per mille strength. The whole is diluted with cold water to make 300 parts. Into the emulsion thus prepared are entered 10 parts of acetate silk yarn and moved about. The bath is heated within ¾ hour to 75° C. and dyeing is continued for about ½ hour at this temperature. Rinsing and brightening follow. There are obtained vivid red violet shades.

What we claim is:—

1. The dyestuffs of the general formula

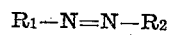

wherein $R_1$ means an aryl radical of the benzene series which contains an OH-group in ortho-position to the —N=N-group and an $NO_2$-group in para-position to the same —N=N-group, and wherein $R_2$ means an aryl-radical of the benzene series which contains an

group in para-position to the —N=N-group, $R_3$ meaning a hydroxyalkyl-group which contains at least two carbon atoms, and $R_4$ meaning hydrogen or alkyl, which products form dark powders dissolving in ethyl acetate to red to violet solutions, and dyeing acetate silk or quite generally cellulose ester and cellulose ether from aqueous suspensions fast red to violet tints of great purity.

2. The dyestuff of the general formula

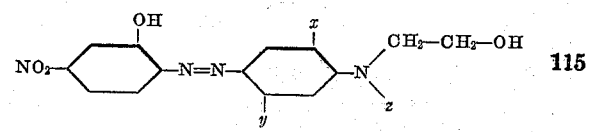

wherein $x$ stands for hydrogen, alkyl or alkoxy, $y$ for hydrogen, alkyl or alkoxy, and $z$ for hydrogen, alkyl or alkoxy, which products form dark powders dissolving in ethyl acetate to red to violet solutions, and dyeing acetate silk or quite generally cellulose ester and cellulose ether from aqueous suspensions fast red to violet tints of great purity.

3. The dyestuff of the formula

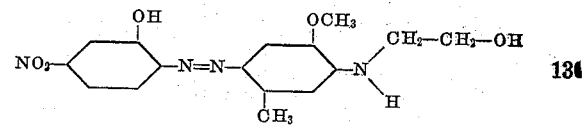

which product forms a dark powder dissolving in ethyl acetate to violet solutions, and dyeing acetate silk or quite generally cellulose ester and cellulose ether from aqueous suspensions fast red violet tints of great purity.

FRIEDRICH FELIX.
WILHELM HUBER.